Figure 1:
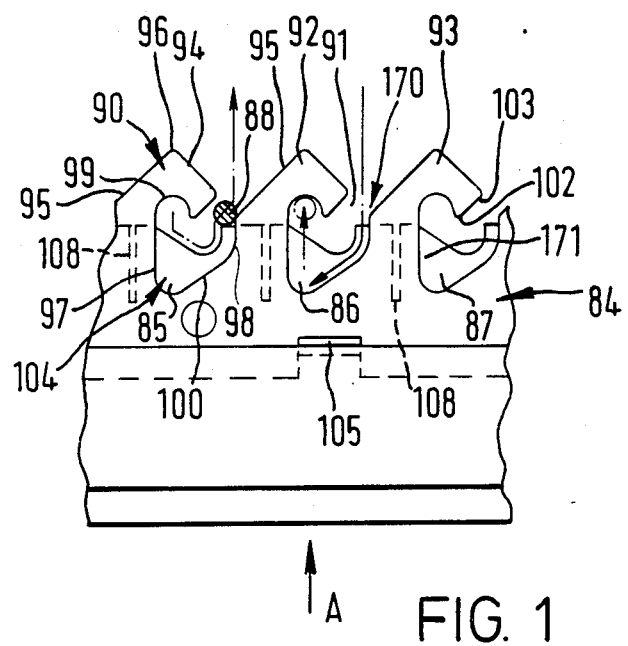

United States Patent [19]

Ball

[11] Patent Number: 4,667,797
[45] Date of Patent: May 26, 1987

[54] FRICTION CLUTCH FOR A VEHICLE

[75] Inventor: Robert J. Ball, Leamington Spa, England

[73] Assignee: Automotive Products plc, Leamington Spa, England

[21] Appl. No.: 811,420

[22] Filed: Dec. 20, 1985

[30] Foreign Application Priority Data

Jan. 10, 1985 [GB] United Kingdom ............... 8500602

[51] Int. Cl.⁴ .............................................. F16D 23/14
[52] U.S. Cl. .................................. 192/98; 192/70.13; 192/110 B; 192/DIG. 1
[58] Field of Search .................. 192/98, 110 B, 70.13, 192/89 B, DIG. 1, 70.27; 403/348, 349, 350, 353

[56] References Cited

U.S. PATENT DOCUMENTS 4,529,075 7/1985 Renaud ........................ 192/110 B
4,529,076 7/1985 Renaud ........................ 192/110 B

FOREIGN PATENT DOCUMENTS 2304828 10/1976 France ............................. 192/98
2533651 3/1984 France ........................... 192/89 B Primary Examiner—Rodney H. Bonck
Assistant Examiner—David A. Testardi
Attorney, Agent, or Firm—Solon B. Kemon

[57] ABSTRACT

A friction clutch for a vehicle utilizes a snap connection and self indexing to insure accurate presentation during installation. The release mechanism of the clutch includes a first member for applying release forces to a second member which releases the clutch. A guide member is provided to constrain a projection on one of the members to follow a first path into a recess when assembling the first and second members and to follow a second path out of the recess when separating the first and second members.

18 Claims, 6 Drawing Figures

FRICTION CLUTCH FOR A VEHICLE

The invention relates to a friction clutch for a vehicle and is particularly concerned with an improvement in the friction clutch described in our co-pending application Ser. No. 742,699 filed June 7, 1985.

The friction clutch of Ser. No. 742,699 includes a clutch release mechanism which requires combined axial and rotary relative movement between first and second members to interconnect the members. Clutch release forces can be transmitted from one member to the other. In order to disengage the two members it is necessary to effect relative rotation thereof in an opposite sense which in Ser. No. 742,699 entails the use of a flange 69 on one member which is grasped and rotated manually.

Whilst such an arrangement is perfectly adequate where ample room is available for the mechanic to reach the flange, there are applications where the flange would not be easy to reach. The present invention is intended to facilitate release of the members without having to use such a flange.

According to the invention there is provided a clutch release mechanism comprising a first member for applying release forces to a second member to release the clutch, one of said members defining a locating recess for a projections on the other member, said projection being locatable in the recess by effecting relative movement between the members, said recess extending behind a retainer section of said one member which inhibits disengagement of the projection and recess on application of axial clutch release forces and a guide member adjacent the recess which enables the projection to enter the recess along a first path on urging the first or second member axially towards the other and which constrains the projection to leave the recess at least partly along a second path as a result of further movement of the first or second member axially towards the other to enable the first and second members thereafter to be separated.

The invention enables release of the two members to be achieved by relative axial movement without having to apply any substantial manual rotary movement by means of a flange thereby simplifying dismantling of the clutch release mechanism.

Preferably the second path defined by the guide member terminates adjacent an entry defined by spaced surfaces of the recess defining member, one of said surfaces being so arranged that relative movement of the first and second members to disengage the projection from the recess causes the projection and said one surface to align whereby subsequent separation of the first and second members enables the projection and one surface to interengage so as to direct the projection through the entry.

Preferably the recess defining member includes an edge engageable with the projection and defining part of the recess, said edge being inclined whereby relative axial movement in one sense between the first and second members to locate the projection in the recess causes said inclined edge to effect relative rotary movement between the first and second members, and the guide member includes an inclined edge engageable with the projection whereby relative axial movement in said one sense between the first and second members to disengage the projection from the recess effects opposite relative rotary movement between the first and second members.

The guide member may be resilient or may be resiliently mounted.

Preferably, the guide member includes a section defining surface over which the projection passes when entering the recess and an edge which engages the projection as the projection leaves the recess. The action of the projection engaging the surface may resiliently deflect the said section of the guide member. In such a case the projection preferably disengages the surface of said section of the guide member when reaching predetermined position in the recess thereby permitting the said section to return to its undeflected condition.

The guide member may include a second section having a surface over which the projection passes, the second section being spaced from the first said section whereby the projection disengages said surface of the first section and engages the surface of the second section as the projection enters the recess. Preferably the action of the projection engaging the surface of the second section resiliently deflects the said second section.

The guide member is preferably carried by the recess defining member.

A plurality of said recesses may be defined to located one projection or respective projections. In such a case one guide member may be arranged adjacent each recess.

According to a further feature of our invention we provide a friction clutch for a vehicle including a clutch release mechanism, said clutch release mechanism comprising a first member, a second member, means for applying release forces to the second member from the first member to release the clutch, one of the members defining a locating recess for a projection on the other member, said projection being locatable in the recess upon relative movement between the members, said recess extending behind a retainer section of said one member for inhibiting disengagement of the pin and recess on application of axial clutch release forces, a guide member adjacent the recess, the guide member enabling the projection to enter the recess along a first path and constraining the projection to leave the recess at least partly along a second path upon movement of one of the first or second members axially towards the other.

Figure 3:
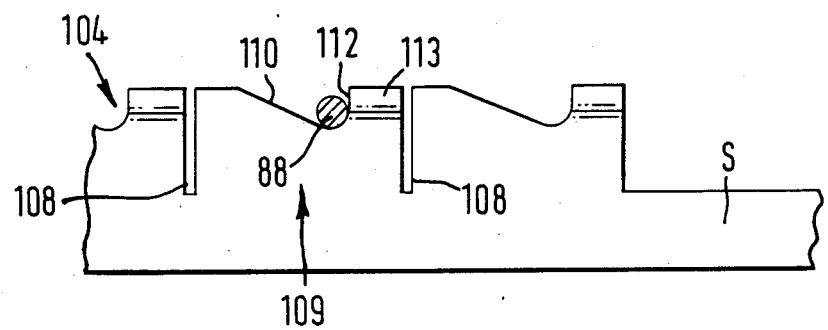
Figure 2:
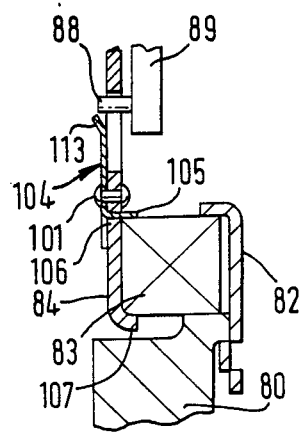
Figure 4:
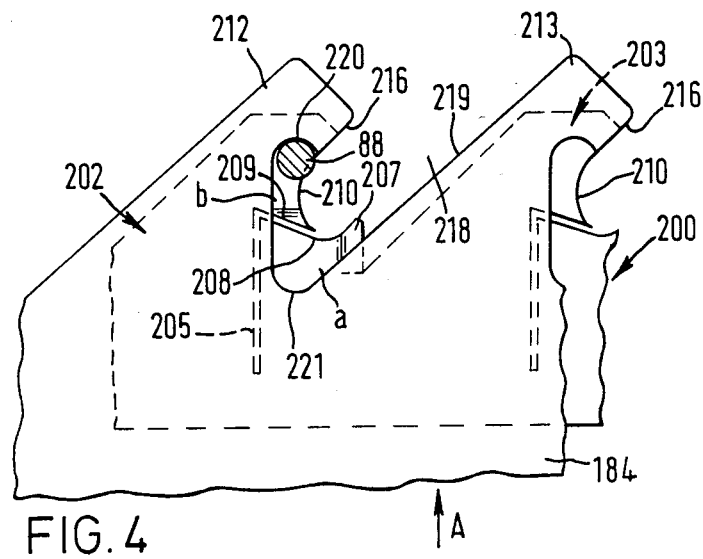
Figure 5:
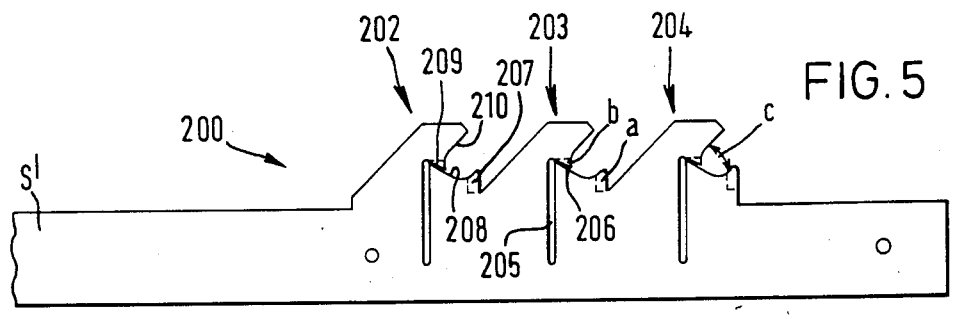
Figure 6:
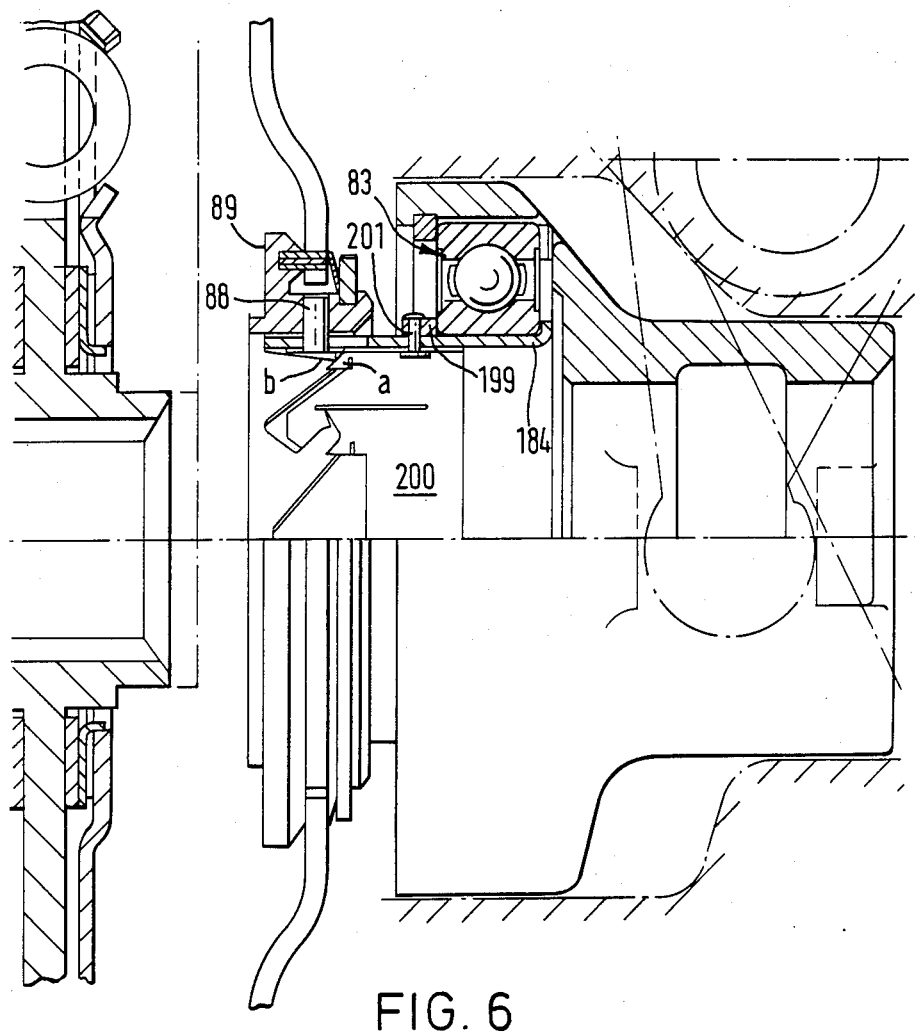

A friction clutch in accordance with the invention will now be described by way of example with reference to the accompanying drawings in which:

FIG. 1 is a view of part of a release mechanism for a friction clutch in accordance with the invention, FIG. 2 is an axial cross-section of the mechanism shown in FIG. 1, FIG. 3 is an enlarged view of part of a guide member, FIG. 4 is a view of part of an alternative release mechanism, FIG. 5 is a view of a development of a guide member for the release mechanism of FIG. 4 drawn to a smaller scale, and FIG. 6 is an axial cross-section of the release mechanism of FIG. 5.

In a typical construction of clutch release mechanism, a member for engaging a release fork is axially fast with an outer race of a release bearing, and a clutch release member engages a plurality e.g. three, radial projections or pins, the projections being equally spaced circumferentially around a hub for a clutch diaphragm spring.

Detailed construction of a pull type clutch and a full development of a recess defining member is described in the above co-pending application and will not be described in detail here.

A release fork engaging member 80 is axially fast with an outer race of a release bearing 83. The inner race of the bearing is axially fast with a clutch release member 84 which defines a plurality of recesses (three only of which 85, 86 and 87 are shown in FIG. 1). The recesses receive a plurality, e.g. three, radial pins 88 equally spaced circumferentially around a hub 89 of a clutch diaphragm spring (not shown) for a pull type clutch. As described in the above co-pending appliation, the cluth release member 84 is formed from sheet metal which is bent into cylindrical form.

The recesses 85,86 are defined between lead-in fingers 90,92,93 each of which has two lead-in edges 94, 95. Converging to a leading end 96. The edge 95 of finger 92 leads into recess 85 which has axially extending edges 97,98 a pin retaining concave edge 99 and an oblique edge 100. The concave edge 99 terminates at a retention portion 102 (see finger 93) and an edge 103 extends between lead-in edge 94 and retention portion 102 parallel with lead-in edge 95 to define an entry 91.

A resilient guide member 104 is formed from a strip S of sheet metal bent into cylindrical form and is secured by rivets 101 to the inner surface of the cylindrical release member 84. As shown in FIG. 2 the guide member 104 has bent-up sprags 105 whch project through apertures 106 in the release member. The inner race of the release bearing 83 is retained between an upturned edge 107 on the release member 84 and the sprags 105. The guide member is formed with three resiliently deformable leaves 109 with axial slots 108 therebetween. Each leaf has a front surface formed with an inclined edged 110 terminating a stop edge 112 defined by an inwardly bent ramp section 113. The circumferential orientation of the guide member 104 and the release member 84 can be seen in FIG. 3

In use the release member 84 is inserted forwardly (direction A) into the spring hub 89. As in the above co-pending application three of the fingers on the release member (fingers 90 to 93) are extended to ensure that one of them will always engage a pin on the hub. The three leaves 109 are associated with the three extended fingers. Thereafter, axial movement of the release member causes the pins 88 to enter the recesses and one such pin 88 is shown entering recess 85. The inner end of the pin 88 rides on the ramp 113 causing the associated leaf 109 to deflect inwardly. Continued forward movement of the release member causes the edge 100 and pin to interengage thereby automatically turning the release member clockwise viewed in direction A in FIG. 1. The pin eventually engages edge 97 and an opposite axial movement in the clutch release direction causes the concave edge 99 to move towards pin 88. As it does so, the pin slips off the outer surface of leaf 109 which then snaps back into its undeflected position. Releasing forces can then be transmitted from the release member 84 to the hub 89 through pins 88.

To remove the clutch release member, the latter is urged axially foward again thereby causing the edge 110 of the leaf 109 to engage the pin 88. Continued axial movement causes the edge 110 to ride along the pin thereby effecting automatic anticlockwise rotation of the release member until the pin and stop 112 interengage as shown in FIG. 3. The pin is thereby aligned with edge 103 of finger 90 so that rearward axial movement of the release member 84 causes edge 103 to strike and ride along the pin so that the pin passes through the entry 103. The release member 23 can then be completely removed.

Reference is now made to FIGS. 4 to 6 which show part of a modified clutch release mechanism.

A guide member 200 is formed form a strip S' of sheet metal bent into cylindrical form and is secured by rivets 201 to the inner surface of the release member 184 of the kind shown in the aforesaid co-pending application. The rivets 201 extend through a retainer e.g. a ring 199 which engages the inner race of bearing 83. The guide member 200 is formed with three resiliently deformable leaves 202, 203, 204 each of which comprises two independently resiliently deformable sections a, b which are separated from each other by axial slits 205 and transverse slits 206. Section a has an inwardly bent ramp section 207 and a concave edge portion 208. Section b has an inwardly bent ramp section 209 and a pin lead-out edge 210. The concave edge portion 208 and concave portion of edge 210 are arcs of equal radius struck about a common centre C.

In use, the three leaves 202, 203, 204 are associated with three fingers (two only 212, 213 of which are shown in FIG. 4) with the lead-out edges 210 in alignment with edges 216 of the fingers. As the clutch release member 84 is inserted in direction A into the spring hub 89, a pin 88 enters one of the recesses, say, recess 218 through an entry between the fingers 212, 213. Engagement of an oblique edge 219 of finger 213 with the pin 88 causes the member 184 to rotate clockwise as it is moved forward. The pin eventually rides up ramp section 207 of section a deflecting the latter inwardly until the pin engages a concave edge 221 of member 184. The release member 184 is then moved in the cluth release direction causing the pin to disengage section a so that the latter snaps back to its undeflected condition and rides up ramp section 209 thereby deflecting section b inwardly. Eventually the pin engages a pin retaining concave edge 220 on finger 212. Releasing forces can then be transmited from the release member 184 to the hub 89 through the pins 88.

To remove the clutch release member, the latter is moved axially in direction A again thereby causing the section b to slide beneath the pin until the latter engages concave edge 208 of section a. The edge 208 causes the release member 184 to turn anticlockwise as the latter is urged further in direction A whereby the pin slips over the lead-out edge 210 of section b of the leaf 202. The release member 84 is then withdrawn in the direction opposite to A and the lead-out edge 210 causes the release member to turn anticlockwise whereby the pin 88 rides along the edge 210 and edge 216 to clear the finger 212. The release member 23 can then be completely removed.

In this description the first portion 170 of the or each recess extends from one edge of the member defining the recess at angle to the axial direction of the clutch in which the friction plate is pressed into and withdrawn from engagement with an engine driven rotatable part, and the second portion of the recess 171, including the retainer surface 99 or 220 to inhibit disengagement of the projection from the recess, is disposed at an angle to the axial direction larger than the first said angle.

What is claimed is:

1. A friction clutch for a vehicle which includes a clutch release mechanism comprising a first member for applying release forces to a second member to release the clutch, one of said members defining a locating recess for a projection on the other member, said projection being locatable in the recess upon relative movement between the members, said recess extending behind a retainer section of said one member for inhibiting disengagement of the projection and recess on application of axial clutch release forces, a guide member adjacent the recess, the guide member enabling the projection to enter the recess along a first path by interengagement of the projection and an edge of the recess and constraining the projection to leave the recess at least partly along a second path by interengagement of the projection and an edge of the guide member upon movement of one of the first or second members axially towards the other, said edge of the guide member inhibiting interengagement of the projection and said edge of the recess during the axial movement of said one of the members.

2. A friction clutch for a vehicle as claimed in claim 1 wherein said projection is locatable in the recess by moving the one member axially and rotatably relative to the projection, said recess extending behind a retainer section of said one member which inhibits disengagement of the projection from the recess on application of the axial clutch release forces.

3. A friction clutch for a vehicle as claimed in claim 1 wherein said projection is constrained to leave the recess at least partly along said second path as a result of a further movement of the first or second member axially.

4. A friction clutch for a vehicle as claimed in claim 1 wherein said guide member is resilient, the guide member including a surface over which the projection passes along said first path.

5. A friction clutch for a vehicle as claimed in claim 1 wherein said guide member includes a first section defining a surface over which the projection passes when entering the recess.

6. A friction clutch for a vehicle as claimed in claim 1 wherein said guide member includes a second section having a surface over which the projection passes, said second section being spaced from said first section, the projection being adapted to disengage from the surface of said first section and engage the surface of said second section as the projection enters said recess, the projection resiliently deflecting said second section.

7. A friction clutch according to claim 6 wherein the first said section defines said edge of the guide member.

8. A friction clutch according to claim 1 wherein the said edge of the recess is inclined to the axial direction.

9. A friction clutch according to claim 8 wherein the said edge of the guide member is inclined in an opposite sense to that of said edge of the recess.

10. A friction clutch for a vehicle comprising a friction plate, means to press the friction plate in a first direction parallel to the clutch axis, clutch release means, pull means to withdraw the clutch release means in a withdrawal direction opposed to said first direction, the clutch release means including a first member and a second member which applies clutch release forces to the first member, one of the members defining a recess, the other of the members having a projection, the projection being receivable in the recess upon relative axial movement between the members, the recess being defined between a lead-in edge extending at an angle to the axial direction and a retainer edge at a larger angle to said axis, said retainer surface being arranged to inhibit disengagement of the projection from the recess on application of axial pull clutch forces, and being dimensioned to permit disengagement of the projection from said recess following subsequent relative axial movement between the members, and a guide member positioned adjacent said recess, the guide member extending the projection to enter the recess along a first path by interengagement of the projection and said lead-in edge and constraining the projection to leave the recess at least partly along a second path by interengagement of the projection and an edge of the guide member upon movement of one of the first and second members axially towards the other, said edge of the guide member inhibiting interengagement of the projection and said lead-in edge of the recess during the axial movement of said one of the members.

11. A friction clutch for a vehicle as claimed in claim 10 wherein said guide member is resilient, the guide member including a suface over which the projection passes along said first path.

12. A friction clutch for a vehicle as claimed in claim 11 wherein said guide member includes a first section defining a surface over which the projection passes when entering the recess.

13. A friction clutch for a vehicle as claimed in claim 12 wherein said guide member includes a second section having a surface over which the projection passes, said second section being spaced from said first section, the projection being adapted to disengage from the surface of said first section and engage the surface of said second section as the projection enters said recess, the projection resiliently deflecting said second section.

14. A friction clutch according to claim 10 wherein the first said section defines said edge of the guide member.

15. A friction clutch according to claim 10 wherein the said edge of the guide member is inclined in an opposite sense to that of said lead-in edge of the recess.

16. A friction clutch for a vehicle comprising a friction plate, means to press the friction plate in a first direction parallel to the clutch axis, clutch release means, pull means to withdraw the clutch release means in a direction opposed to said first direction, the clutch release means including a first member and a second member, one of the members defining a recess, the other of the members having a projection, the projection being receivable in the recess upon relative axial movement between the members, the recess having a first portion extending from one edge of the member at an angle to said axis and a second portion at a larger angle to said axis, said second portion including a retainer surface to inhibit disengagement of the projection from the recess on application of axial pull clutch forces, the second portion being dimensioned to permit lateral disengagement of the projection from said second portion of the recess upon subsequent relative axial movement between the members, and a resilient guide member which effects the lateral disengagement of the projection from said second portion of the recess and which is positioned adjacent each said recess, said guide member defining a first path along which the projection is receivable in the recess and a second path along which the projection is disengaged from the recess, said second path terminating adjacent one end of said first portion, the projection being aligned with said one end upon disengagement from the second portion to permit disconnection of the projection from the recess, and the guide member including a surface over which the projection passes along said first path and an edge which the projection engages along said second path.

17. A friction clutch for a vehicle as claimed in claim 16 wherein said guide member includes a first section defining said surface over which the projection passes when entering the recess.

18. A friction clutch for a vehicle as claimed in claim 16 wherein said guide member includes a first section defining said surface over which the projection passes when entering the recess and a second section having a surface over which the projection passes, said second section being spaced from said first section, the projection being adapted to disengage from the surface of said first section and engage the suface of said second section as the projection enters said recess, the projection resiliently deflecting said second section.

* * * * *